(12) United States Patent  (10) Patent No.: US 7,793,966 B2
Richter et al.  (45) Date of Patent: Sep. 14, 2010

(54) PLUG-IN CONNECTIONS

(75) Inventors: Martin Richter, Frankfurt am Main (DE); Achim Strütt, Riedstadt (DE); Michael Eiermann, Pfungstadt (DE); José Manuel Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 304 days.

(21) Appl. No.: 11/596,302

(22) PCT Filed: May 13, 2005

(86) PCT No.: PCT/EP2005/005235

§ 371 (c)(1), (2), (4) Date: Jul. 24, 2008

(87) PCT Pub. No.: WO2005/110836

PCT Pub. Date: Nov. 24, 2005

(65) Prior Publication Data

US 2009/0008903 A1 Jan. 8, 2009

(30) Foreign Application Priority Data

May 14, 2004 (DE) ................... 10 2004 024 333

(51) Int. Cl.
*B60D 1/62* (2006.01)
(52) U.S. Cl. ................... 280/433; 280/434
(58) Field of Classification Search .......... 280/420, 280/421, 422
See application file for complete search history.

(56) References Cited

U.S. PATENT DOCUMENTS

| 3,888,513 | A | * | 6/1975 | Pilz et al. ............. 280/421 |
| 5,060,964 | A |   | 10/1991 | Vick |
| 5,732,966 | A | * | 3/1998 | Menard et al. ......... 280/422 |
| 6,957,823 | B1 | * | 10/2005 | Allen ................. 280/439 |
| 2008/0036175 | A1 | * | 2/2008 | Alguera .............. 280/420 |

FOREIGN PATENT DOCUMENTS

| DE | 2 039 340 | 2/1972 |
| DE | 101 55 056 | 6/2003 |
| EP | 0 084 712 | 8/1983 |
| EP | 0 285 477 | 10/1988 |
| JP | 11-222163 | 8/1999 |
| WO | WO 03/039940 A1 | 5/2003 |

* cited by examiner

*Primary Examiner*—Lesley Morris
*Assistant Examiner*—Jacob Knutson
(74) *Attorney, Agent, or Firm*—Hudak, Shunk & Farine Co., LPA

(57) ABSTRACT

Disclosed is a plug-in coupling system for joining cables between a tractor and a trailer. The invention also relates to the individual components, i.e. the semitrailer coupling and the plug-in connector on which the invention is implemented. The cables between the tractor and the trailer are usually plugged into each other by hand. Automatic systems have not been successful on the market so far. The aim of the invention is therefore to create a plug-in coupling system which allows the supply cables to be connected in a comfortable and operationally safe manner when the trailer is joined to and disconnected from the tractor. Said aim is achieved, among other things, by disposing the socket in a stationary manner below the insertion hole on the semitrailer coupling while arranging the contact points of the plug below the king pin on the plug-in connector.

21 Claims, 3 Drawing Sheets

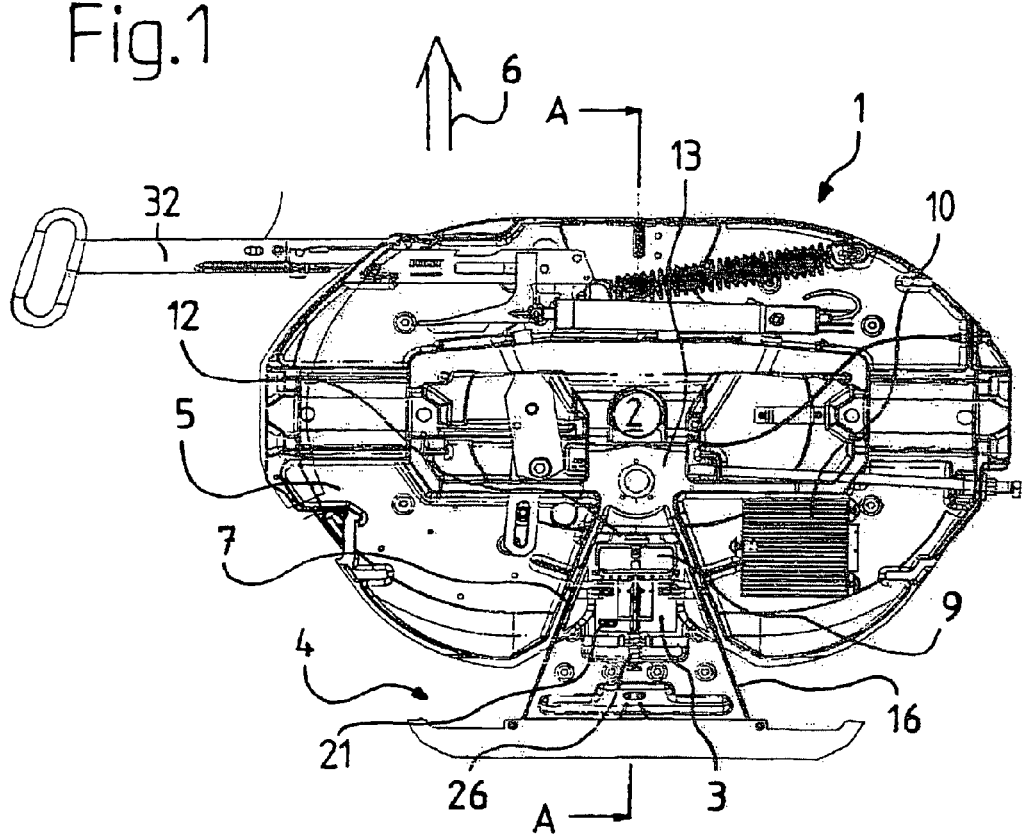
Fig.1
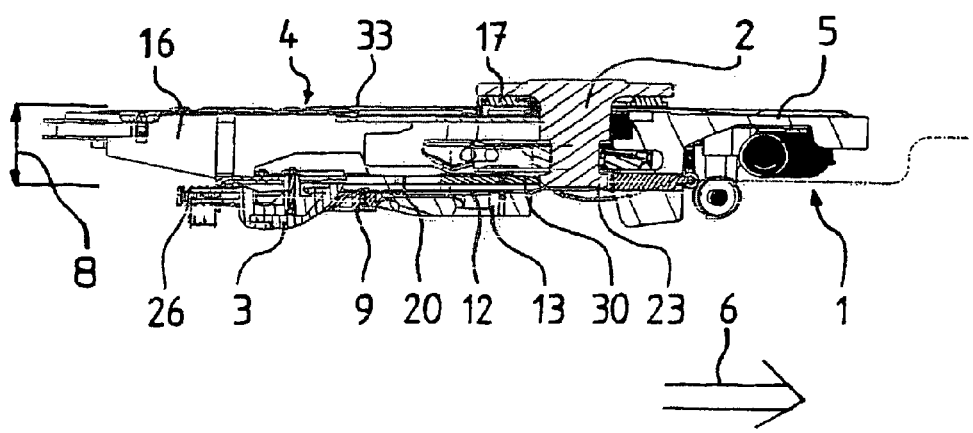
Fig. 2   A-A

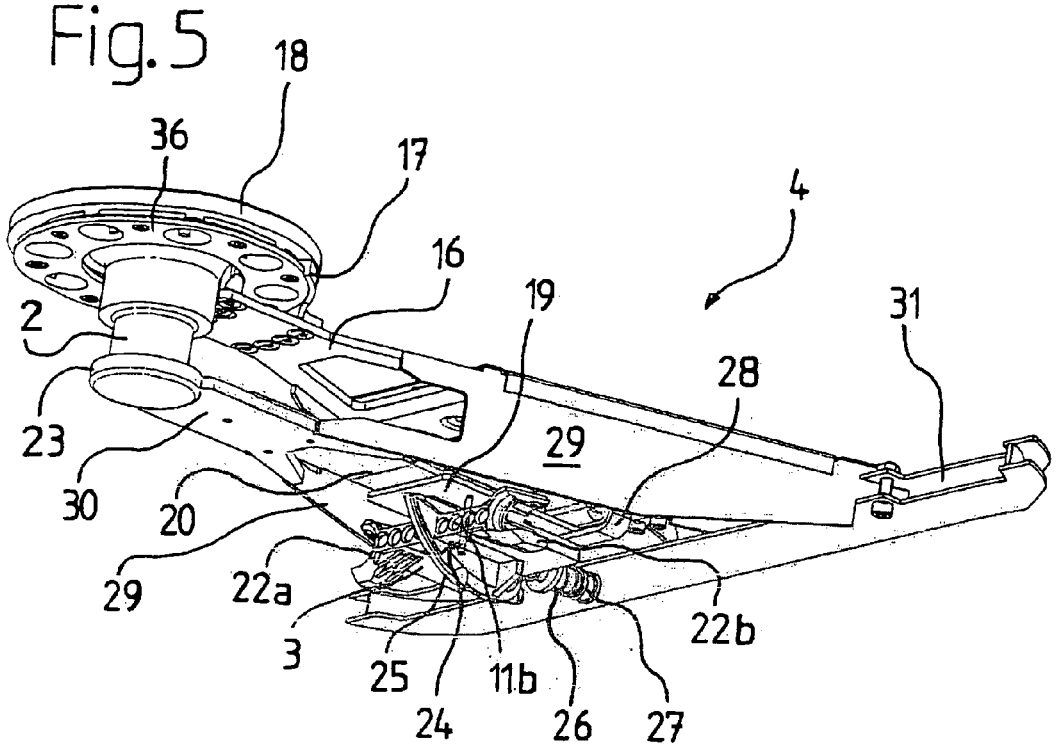
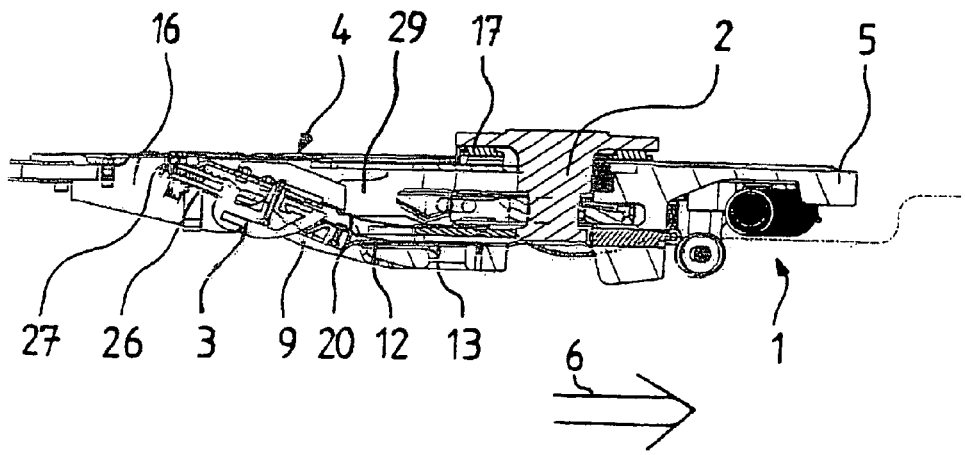

PLUG-IN CONNECTIONS

FIELD OF THE INVENTION

The invention concerns a plug-in coupling system for joining lines between a tractor and a trailer according to the claims. The invention also pertains to a fifth wheel and a plug-in connector on which the system is implemented.

The lines can be supply lines, e.g., for power or pressurized air.

The tractor and trailer form a road train, that is, a fifth wheel is arranged on the tractor, with which a king pin situated on the underside of the trailer engages and is locked. The plate of the fifth wheel is usually configured with an insert hole for coupling of the trailer, tapering in the shape of a wedge in the direction of travel, and the insert hole has a clear space with a depth at least sufficient to allow the king pin to move in and out of the fifth wheel. During the coupling process, the trailer slides relative to its vertical orientation on the surface of the fifth wheel plate. The lateral guidance is provided by the king pin, which is constrained during the coupling process in the insert hole until it reaches its locking position. Hence, no structural parts are allowed to protrude into the insert hole.

The insert hole is bounded at the bottom by the length of the king pin. Parts located beneath the insert hole, such as stiffening ribs, therefore can no longer get caught by the king pin when the trailer is being coupled and uncoupled.

BACKGROUND OF THE INVENTION

Plug-in coupling systems are known in various configurations. In the most simple case, there is a plug and a socket, each of them fastened to more or less elastic lines. For safety reasons, the current carrying end of the system is usually designed as a socket on the tractor. After the trailer has been coupled to the tractor, the supply lines still have to be joined together, which is usually done manually by the driver. Before uncoupling the trailer, the plug-in system has to be separated once again. If this is forgotten by accident, the coupling system or the supply lines will be torn away from each other.

Therefore, efforts have already been made to automate the joining and separating of the plug-in coupling systems and also to make this more safe. Two different approaches have basically been taken in the development of such systems.

First, there are plug-in coupling systems in which a connection between the supply lines is produced by means of a drive unit. Such an active system is specified, for example, in DE 101 55 056 A1. The known plug-in coupling system comprises a socket, which is arranged so that it can move in the fifth wheel and can be moved by its drive unit into a socket on the trailer.

To avoid damage to the socket, these systems are preferably outfitted with a sensor system, which recognizes the presence of a trailer and retracts the socket if it has been erroneously extended before any damage is caused to the coupling system during the coupling of the trailer.

As an alternative to these technically expensive plug-in coupling systems with moving components of the coupling system, there have been attempts to realize the connection of the supply lines in dependence on the presence of a trailer by means of a permanently installed plug or a permanently installed socket. Such passive systems are described in the following publications.

U.S. Pat. No. 5,060,964 discloses a fifth wheel in which the contacts are permanently arranged in the end region of the fifth wheel horns on either side of the insert hole. These interact with likewise permanent contacts on the underside of the trailer. A relative movement between the tractor contacts and the trailer contacts is prevented by a fifth wheel mounted on a pivoting base. Such a fifth wheel, in which the transmission of force between tractor and trailer is diverted in point-like manner via the pivoting base into the conductor frame of the tractor, can hardly be installed in present day tractors without considerable expense in the form of reinforcements on the tractor. Furthermore, the structural height of the fifth wheel is substantially further increased, which will in no way be welcome to the automobile makers and trucking companies, since the cargo volume will be reduced for a given maximum vehicle height.

Moreover, it has been shown in practice that the contacts due to their exposed position in the end region of the fifth wheel horns often get damaged in the coupling process due to the king pin not being exactly situated in the insert hole, so that the entire coupling system can no longer be used.

Another prior art forming its own category is DE-OS 20 39 340 with an automatic electrical air coupling, which interacts with a fully automatic fifth wheel coupling to enable the coupling and uncoupling of the trailer of a road train without the driver needing to leave his cabin. The automatic electrical air coupling is realized by a two-part coupling piece, embracing the king pin, and having contact points at its end face, which interact with contact points in the front end region of the fifth wheel coupling when the trailer is being coupled. The coupling piece is configured as a plug-in connector with a support element, and the support element has means for mounting around the king pin in swiveling manner. The main drawback of this system is the high mechanical strain on the coupling piece, which is further weakened by having a number of boreholes running in the lengthwise direction to lead in the cables or compressed air lines. Another major problem is to achieve a secure contact between the coupling piece and the fifth wheel coupling in the end region, which is greased, since the grease fouls the contacts and a flow of electricity is not always guaranteed.

SUMMARY OF THE INVENTION

Therefore, the problem of the invention is to develop a passive plug-in coupling system that makes possible a comfortable and safe connection of the supply lines when coupling and uncoupling a trailer in a road train. Additional problems involve the configuration of the fifth wheel coupling and the plug-in connector for good operational reliability and compatibility with existing fifth wheel coupling systems.

The problem is solved according to the invention with a plug-in coupling system in which the socket is arranged permanently on the fifth wheel coupling beneath the insertion hole and the contact points of the plug are arranged on the plug-in connector beneath the king pin.

By permanent is meant a drive-free mounting of the socket, that is, with no possibility of movement to bring about a contact with the plug on the trailer. The arrangement of the socket directly on the fifth wheel coupling beneath the insertion hole offers the benefit that the fifth wheel coupling can be built with a very low design, since the socket swivels with the fifth wheel coupling around its bearing when a vertical bending occurs between tractor and trailer. This would not be possible for a socket permanently arranged on the tractor. If the socket were placed on the vehicle beneath the fifth wheel coupling, one would have to maintain a safety margin between fifth wheel coupling and socket corresponding to the swivel angle of the coupling, which would result in an elevated position of the coupling on the tractor. This would be at the cost of cargo room and could hardly be acceptable.

The socket, furthermore, is situated in a protected region, since the insertion hole above the socket has a greater structural depth than the length of the king pin and therefore no collision can occur with the king pin. The fifth wheel plate extends beyond the socket in the direction of the trailer, so that the socket cannot get damaged even when the trailer is standing too low and it knocks against it.

The vertical level of the plug situated on the plug-in connector is basically dictated by the position of the socket and, since the socket in the coupled state of the trailer is located underneath the insertion hole, dictated by the length of the king pin, it is likewise situated underneath the king pin.

Since the king pin when locked in the fifth wheel coupling is no longer present in the insertion hole, the position of the socket beneath the insertion position means that the plug is arranged on the trailer in relation to the king pin and it is retracted into the socket underneath the king pin when the king pin is in locked position.

Preferably, the plug-in coupling system has a data detection and evaluation unit arranged on the tractor, which is connected to a sensor to sense the locked condition of the fifth wheel coupling. This makes possible a coupling and uncoupling from the driver's cabin of the tractor, in conjunction with a remote-controlled fifth wheel coupling.

In one particular embodiment, the plug and the socket each have eight contact points.

Advantageously, the plug and the socket are made of plastic. A plastic design in the case of electrical power supply lines reduces the expense of an electrical insulation of other current-conducting parts of the vehicle.

Furthermore, the plug-in coupling system is permanently exposed to weather influences and also in winter to road salt, so that corrosion could cause substantial damage to the coupling system. Thanks to the plastic design, however, corrosion problems are largely eliminated.

The second problem is solved with a fifth wheel coupling in which a socket is permanently arranged underneath the insertion hole.

The socket can be held with a coupling leaf spring, and the coupling leaf spring should be flexible in the vertical direction. Thanks to the coupling leaf spring, a vertical height adjustment of the socket is possible.

Preferably, the coupling leaf spring engages by its end opposite the socket with a cross piece of the fifth wheel coupling, arranged underneath the insertion hole.

In one favorable embodiment, the socket is oriented with an insertion hole in the direction of travel.

Furthermore, it has proven to be advantageous to design the socket with guide arms arranged at the side. The guide arms protrude beyond the socket opposite to the direction of travel and facilitate a joining of plug and socket. Preferably, the guide arms taper conically and have their greatest thickness in the region of the socket. It is especially advantageous for the plug to be likewise designed with complementary guide elements, in which the guide arms first engage at the start of the coupling process, so that afterwards the plug is forced to move toward the socket until the mechanical connection between plug and socket is made.

The other problem of furnishing a plug-in connector is solved with a plug arranged on a support element, in which the contact points are arranged underneath the king pin.

Preferably, the plug is arranged on the underside of the support element or inside the support element in a suitably shaped cavity open toward the bottom.

The support element can have a shape complementary to the wedge-shaped insertion hole. Thanks to this, the support element will always be oriented in the same position to the fifth wheel coupling, so that the connection between plug and socket can be especially precise.

Advantageously, the means for the swiveling mounting of the support element engages with the king pin and/or a mounting plate of the king pin. The king pin represents the pivot point of the trailer. An ever constant spacing from the king pin in the radial direction ensures that both the socket and the plug introduced into the socket is largely decoupled from the pivoting motion of the trailer when there occurs a relative movement between trailer and tractor and thus is only subject to a slight strain.

Preferably, the plug is arranged on a base plate on the support element. The important functional elements of the plug are brought together on the base plate. If there is a defect, this can be very quickly remedied by replacing the entire base plate.

Advantageously, the base plate is spring-mounted in the vertical direction by means of a support element leaf spring. This makes possible a height adjustment, especially during the hooking up of the trailer until such time as the connection between plug and socket is finally achieved. After the connection of plug and socket, an adjustment occurs in the vertical direction thanks to both the coupling leaf spring and the support element leaf spring.

The support element leaf spring can be fastened to the support element by its end away from the base plate.

In addition, the base plate can also be held in and able to shift sideways in longitudinal slots. Pins or bolts fixed to the support element protrude through the longitudinal slots. A structurally simple sideways end stop for the base plate can be produced by support arms at a distance from the base plate on either side, while the support arms also overlap the base plate in its end stop.

To equalize out a relative movement between tractor and trailer in the direction of travel, the plug can be spring-loaded against the base plate in the direction of travel of the tractor. The spring loading can be done, for example, by means of a helical spring oriented axially in the direction of travel. Preferably, the helical spring is placed under load as a compression spring. Thanks to the spring loading of the plug, the plug-in connection is mechanically decoupled from the motions of the vehicle, so that on the one hand there is less wear and tear, and on the other hand an always constant insertion force of the plug in the socket is achieved. This is desirable, for in this way the plug is always inserted at full depth in the socket and the contact surface between plug and socket remains constant.

These constant relations in the coupled state ensure a largely constant electrical resistance for the plug-in coupling system.

Advantageously, the plug has guide elements on either side to receive guide arms of a socket. For this, the guide elements can be in the shape of a half-moon, for example, with the open side pointing outwards. Such guide elements are grasped especially easily during the coupling of suitably configured guide arms, as already described above, and the plug is precisely oriented to the socket as it continues to approach it.

Preferably, the contact points of the plug are oriented in the direction of travel of the tractor. This orientation coincides with the preferably chosen orientation of the insertion hole or insertion holes of the socket and supports an easy connection of plug and socket by hooking up the trailer to the tractor in dependence on the position of the king pin in the fifth wheel coupling.

Especially favorably, the plug is configured with a glide shoe on its underside. The trailers are often taken up by different tractors, perhaps not all of which are outfitted with a fifth wheel coupling that supports a connection of the lines with the plug-in coupling system under discussion. The plug is then especially endangered if reinforcement ribs or similar bulky structural parts of the fifth wheel coupling are arranged in the area underneath the insertion hole, against which the plug might knock and become damaged. Thanks to the glide shoe with its semicircular bottom, in conjunction with the vertical spring loading of the plug and the base plate, the plug is lifted up from the danger zone.

For this, the support element has a free space at its underside for the plug to retract into the support element.

BRIEF DESCRIPTION OF THE DRAWINGS

For a better comprehension, the invention will be explained by means of the following six figures. These show:

FIG. 1: a bottom view of a fifth wheel coupling with king pin retracted and plug-in coupling system connected;

FIG. 2: a longitudinal section along line A-A in FIG. 1;

FIG. 5: a perspective view of a plug-in connector with king pin from below at a slant;

FIG. 6: a longitudinal section per FIG. 2 with plug recessed inside the support element.

DETAILED DESCRIPTION OF THE INVENTION

Figure 3:
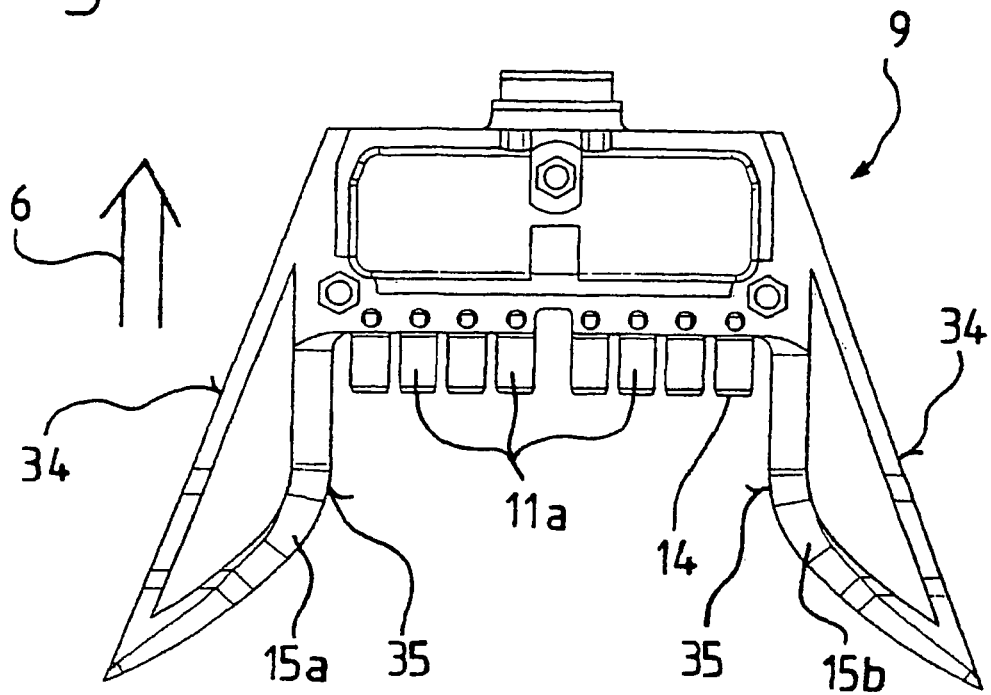
FIG. 3: a bottom view of a socket.

FIG. 1 shows a king pin 2 of a trailer (not shown), retracted inside the fifth wheel coupling plate 5 and interlocked with the fifth wheel coupling 1.

At the side of the fifth wheel coupling 1 opposite the direction of travel of the tractor (also not shown), the coupling plate 5 has a V-shaped recess, forming an insertion hole 7 for the king pin 2. During the hooking up of the trailer, the king pin 2 will at times be situated not precisely centered behind the fifth wheel coupling plate 5. In these cases, the king pin 2 will be constrained by the walls of the insertion hole 7 and thereby taken to its locking position. Beneath the insertion hole 7, in the foreground of FIG. 1, is situated the cross piece 13, past which the king pin 2 moves both when coupling and when uncoupling the trailer.

The socket 9 engages with the cross piece 13 of the fifth wheel coupling 1 with a coupling leaf spring 12 at the same vertical level. The king pin 2 likewise moves past the socket 9 during coupling and uncoupling operations. The coupling leaf spring 12 allows for a vertical flexibility of the socket 9. The socket 9, except for the spring travel of the coupling leaf spring 12, is permanently mounted on the fifth wheel coupling 1.

In the insertion hole 7 there is situated a plug-in connector 4, mounted and able to swivel on the king pin 2 and being shaped complementary to the insertion hole 7, having as structural parts basically the support element 16 and the plug 3 arranged on the underside of the support element 16. The plug 3 is positioned on the support element 16 at a constant distance from the king pin 2, apart from the spring travel of the helical spring 26, said distance being chosen such that the plug 3 is connected to the socket 9 in the coupled position of the king pin 2.

The plug 3 is mounted in longitudinal slots 21 oriented transversely to the direction of travel 6 by means of bolts which are stationary relative to the support element 16, one of which is shown as an example. The more detailed configuration of the plug-in connector 4 is described in conjunction with FIG. 3.

When uncoupling the trailer, the king pin 2 slides opposite the direction of travel 6 out from the fifth wheel coupling 1 and moves across both the cross piece 13 and the socket 9. During this process, the connection between plug 3 and socket 9 is likewise broken.

The fifth wheel coupling 1 per FIG. 1 is outfitted with a data detection and evaluation unit 10, which has been integrated in the fifth wheel coupling 1 beneath the plate 5. Thanks to the data detection and evaluation unit 10 and sensors (not shown), by which the closure condition of the coupling 1 can be sensed, the driver is able to remotely control the closure condition of the coupling 1 from his cabin on the tractor, without having to leave it. Upon malfunctioning of system components of the remote controlled fifth wheel coupling 1, it is still possible to operate the coupling 1 by hand using the activation lever 32.

FIG. 2 shows the fifth wheel coupling 1 with the plug-in coupling system of the invention in a longitudinal section. Here, the king pin 2 is in the interlocked position beneath the coupling 1 and the trailer (not shown) lies with its bottom on the slideway lining 33 of the coupling plate 5. In this coupled position, but also during the coupling process of the trailer, the king pin 2, which is standardized in its axial length and has its lower end bounded by a lower flange 23, is fixed in the vertical direction on top by the load of the trailer and at the bottom by the pressure of the trailer on the slideway lining 33, so that the insertion hole 7 can be designed with a specific structurally dictated depth 8 and is bounded by this. The structural depth 8 is determined by the distance from the lower flange 23 of the king pin 2 to the top of the coupling plate 5, that is, the slideway lining 33.

The socket 9 is situated entirely underneath the insertion hole 7 of the fifth wheel coupling 1, i.e., also its contact points 11a (see FIG. 3) are so situated. Beneath the insertion hole 7 is also situated the cross piece 13, which engages with the coupling leaf spring 12, which in turn carries the socket 9.

The plug 3 is inserted into the socket 9. The plug 3 is secured by a support element leaf spring 20, arranged above the coupling leaf spring 12, at a spacer 30 of the support element 16. In the plug 3, contact points 11b (see FIG. 4, FIG. 5) oriented in the direction of travel 6 are arranged, whose vertical level largely coincides with the level of the contact points 11a of the socket 9. The support element leaf spring 20 supports only the plug 3 when the trailer is not hooked up and during the coupling process it enables a slight adjustment in height relative to the socket 9.

FIG. 3 shows the socket 9 in a bottom view. The socket 9 is V-shaped, with the two legs being configured as guide arms 15a, 15b. The guide arms 15a, 15b are provided with an even surface on their outer side 34. The angle of the outsides of the legs 34, diverging in a V, corresponds to the aperture angle of the insertion hole 7 and the geometry of the support element 16, which is adapted to that. As shall be further explained in conjunction with FIG. 5, the vertically swiveling socket 9 can swivel into a free space inside the side walls 29 of the support element 16.

The inside 35 of the guide arms 15a, 15b is at first convex curved in a first segment on the trailer side and passes into a second, straight segment, which runs parallel to the direction of travel 6 of the tractor. The first curved segment serves to orient the plug relative to the plug-in connector 9. The second straight segment allows for a uniform shoving of the plug 3 onto the socket 9 without skewing of the plug 3. In this phase, the contact points 11a oriented opposite the direction of travel 6 between the guide arms 15a, 15b go into the contact points 11b of the plug 3. An insertion hole 14 is arranged in each of the total of eight contact points 11a, through which the electric current flows between the socket 9 and the plug 3 connected to it.

Figure 4:
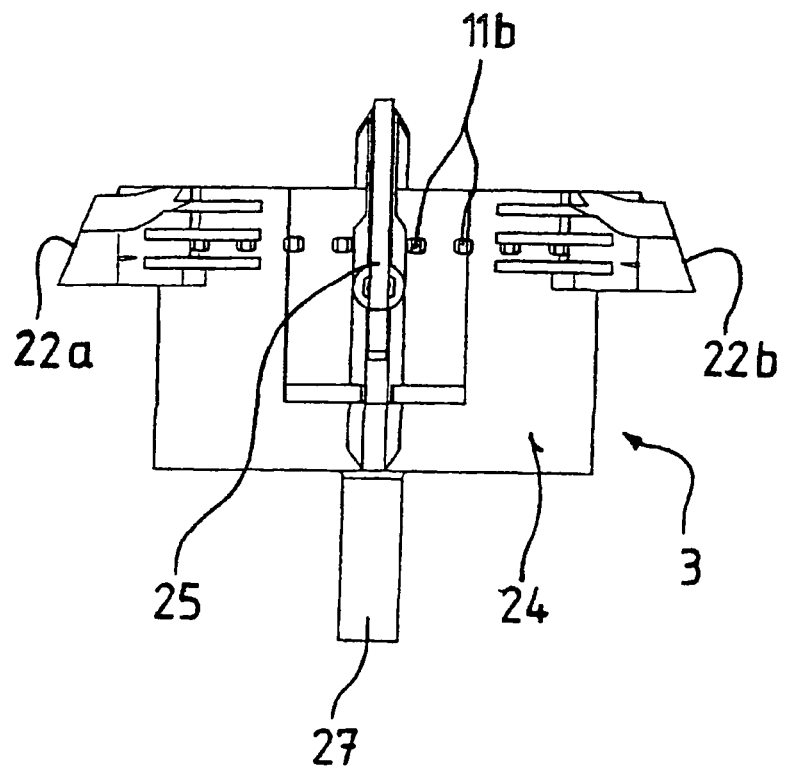
FIG. 4: a bottom view of a plug.

In FIG. 4, the plug 3 is likewise shown in a bottom view. The width of the plug 3 corresponds roughly to the distance between the second straight segment of the inner sides 35 of the first and second guide arms 15a, 15b of the socket 9 (FIG. 3). On either side of the plug 3 there are molded guide elements 22a, 22b, which engage with the guide arms 15a, 15b during the coupling processes and thereby produce a guidance of the plug 3. A cylindrical support prong 27 is arranged in the middle on the side of the plug 3 away from the contact points 11b, onto which a helical screw 26, recognizable in FIG. 5, can be shoved.

FIG. 5 shows a perspective view of a plug-in connector 4 arranged on a king pin 2. The support element 16 of the plug-in connector 4 is provided here with means 17 of a swivel mounting on the king pin 2.

The king pin is fastened by means of a mounting plate 18 on the underside of the trailer. At a spacing from the mounting plate 18 is arranged a support rim 36, which is screwed together with the mounting plate 18. The means 17 grasp the stationary support rim 36 and allow for the plug-in connector 4 to swivel in the circumferential direction of the support rim 36.

The support element 16 of the plug-in connector 4 is fashioned as a V-shaped frame structure, whose sides are adapted to the angle of the insertion hole 7. Side surfaces 29 extend downward from the support element 16 on either side and pass into the common spacer 30 at their end near the king pin. The spacer 30 lies against the bottom flange 23 of the king pin 2 and diverts any tilting moments which occur to the king pin 2.

Between the side walls 29, one notices the plug 3. The plug 3 is fastened to a base plate 19 and the base plate 19, in turn, to the support element 16. In order to minimize wear and tear on the plug-in connector, the plug is mounted so as to be able to move in various spatial directions. As already explained in conjunction with FIG. 3, a sideways equalizing movement is made possible by mounting the base plate 19 on the support element 16 so that it can shift thanks to longitudinal slots 21 (see FIG. 1). However, an often occurring side stopping impact would result in damage to the base plate 19 or its longitudinal slots 21 or the bolts reaching through the longitudinal slots. For this reason, the maximum sideways travel of the base plate 19 is limited by these overlapping support arms 28.

To reduce the impact loads on the plug 3, it is supported against the base plate 19 by the helical screw 26.

An equalization in the vertical direction is made possible by the support element leaf spring 20, which is secured by one end to the base plate 19 and by its other end to the top of the spacer 30. Thanks to its support by the leaf spring 20, the plug 3 can retract into a free space in the support element 16 between the side walls 29.

The connection of the lines is achieved by introducing the contact points 11a (see FIG. 3) of the socket 9 into the contact points 11b of the plug 3.

The plug-in connector is closed at its rear end by a profiled section 31.

To avoid damage to the plug 3 when hooking up the trailer to a tractor with a fifth wheel coupling 1 not having any socket 9, but rather structural parts protruding into this region, a sliding shoe 25 is fashioned on the bottom 24 of the plug 3, which encounters the respective structural part and lifts the plug 3 from the danger zone.

FIG. 6 shows the plug 3 in the maximum raised position. The plug 3 is situated in the free space between the side walls 29 and thrusts by the support prong 27 against the support element 16 from underneath.

LIST OF REFERENCE NUMBERS 1 fifth wheel coupling
2 king pin
3 plug
4 plug-in connector
5 fifth wheel coupling plate
6 direction of travel of tractor
7 insertion hole
8 depth of insertion hole
9 socket
10 data detection and evaluation unit
11a contact point, socket
11b contact point, plug
12 coupling leaf spring
13 cross piece of fifth wheel coupling
14 insertion hole of socket
15a first guide arm of socket
15b second guide arm of socket
16 support element
17 means of swivel mounting
18 mounting plate of king pin
19 base plate
20 support element leaf spring
21 longitudinal slot
22a first guide element of plug
22b second guide element of plug
23 bottom flange of king pin
24 bottom side of plug
25 sliding shoe
26 helical spring
27 support prong of helical spring
28 support arm
29 side wall of support element
30 spacer of support element
31 end profile
32 activation lever
33 slideway lining on coupling plate
34 outer side of guide arm
35 inner side of guide arm
36 support rim

The invention claimed is:

1. A plug-in coupling system for joining lines between a tractor and a trailer, comprising:
   a fifth wheel coupling is arranged on the tractor,
   wherein a king pin is arranged on the trailer for coupling and uncoupling to the fifth wheel coupling, about which a plug-in connector can swivel, having a plug, wherein the plug has contact points,
   wherein the fifth wheel coupling has a plate, having an insertion hole tapering in the shape of a wedge in the direction of travel, wherein the insertion hole has a clear space with a depth at least sufficient to allow the king pin to move in and out of the fifth wheel coupling, and
   wherein the tractor has a socket
   wherein the socket is arranged permanently on the fifth wheel coupling beneath the insertion hole and
   the contact points of the plug are arranged on the plug-in connector beneath the king pin.

2. The system per claim 1, wherein the system has a data detection and evaluation unit arranged on the tractor, which is connected to a sensor to sense the locked condition of the fifth wheel coupling.

3. The system per claim 1, wherein the plug and the socket each have eight contact points.

4. The system per claim 1, wherein the plug and the socket are made of plastic.

5. A fifth wheel coupling for a plug-in coupling system with a fifth wheel coupling plate, having an insertion hole tapering in the shape of a wedge in the direction of travel, wherein the insertion hole has a clear space with a depth at least sufficient to allow a king pin situated on a trailer to move in and out of the fifth wheel coupling, wherein a socket is arranged permanently on the fifth wheel coupling underneath the insertion hole.

6. The fifth wheel coupling per claim 5, wherein the socket is held with a coupling leaf spring.

7. The fifth wheel coupling per claim 6, wherein the coupling leaf spring engages by its end opposite the socket with a cross piece arranged underneath the insertion hole.

8. The fifth wheel coupling per claim 6, wherein the coupling leaf spring is flexible in the vertical direction.

9. The fifth wheel coupling per claim 5, wherein the socket is oriented with an insertion hole in the direction of travel.

10. The fifth wheel coupling per claim 5, wherein the socket is designed with guide arms arranged at the side.

11. A plug-in connector comprising: the plug having contact points arranged on a support element for the plug-in coupling system having the socket according to claim 1 between the tractor and the trailer, wherein the tractor has the fifth wheel coupling plate with the insertion hole tapering in the shape of the wedge in the direction of travel and the trailer has the king pin which can be introduced into the coupling plate, and the support element comprises means for placing the support element on the trailer such that it can swivel, wherein the contact points of the plug are arranged on the support element underneath the king pin.

12. The plug-in connector per claim 11, wherein the support element has a shape complementary to the wedge-shaped insertion hole.

13. The plug-in connector per claim 11, wherein the means for the swiveling mounting of the support element engages with the king pin or a mounting plate of the king pin or a combination thereof.

14. The plug-in connector per claim 11, wherein the plug is arranged on a base plate on the support element.

15. The plug-in connector per claim 14, wherein the base plate is spring-mounted in the vertical direction by means of a support element leaf spring.

16. The plug-in connector per claim 15, wherein the support element leaf spring is fastened to the support element by its end away from the base plate.

17. The plug-in connector per claim 14, wherein the base plate is held and able to shift sideways in longitudinal slots.

18. The plug-in connector per claim 14, wherein the plug is spring-loaded against the base plate in the direction of travel of the tractor.

19. The plug-in connector per claim 11, wherein the plug has guide elements on either side to receive the guide arms of the socket.

20. The plug-in connector per claim 11, wherein the contact points of the plug are oriented in the direction of travel of the tractor.

21. The plug-in connector per claim 11, wherein the plug has a glide shoe on its underside.

* * * * *